United States Patent [19]

Morse

[11] 3,754,282

[45] Aug. 21, 1973

[54] HIGH RESOLUTION RECORDER
[75] Inventor: Leighton L. Morse, San Diego, Calif.
[73] Assignee: The United States of America as represented by the Secretary of the Navy, Washington, D.C.
[22] Filed: Dec. 22, 1972
[21] Appl. No.: 317,874

[52] U.S. Cl....... 346/139 C, 346/139 A, 346/139 C
[51] Int. Cl.................................................. G01d
[58] Field of Search.................... 346/139 R, 139 A, 346/139 C, 33

[56] References Cited
UNITED STATES PATENTS

| | | | |
|---|---|---|---|
| 2,742,339 | 4/1956 | Stamper | 346/139 A |
| 2,740,685 | 4/1956 | Woodbury | 346/139 A |
| 2,593,068 | 4/1952 | Stamper | 346/139 A |
| 2,568,306 | 9/1951 | Stamper | 346/139 A |

Primary Examiner—Richard B. Wilkinson
Assistant Examiner—Pat Salce
Attorney—Richard S. Sciascia

[57] ABSTRACT

A recorder having a rotary driven stylus mechanism electronically cooperating with an electro-sensitive recording paper is modified to allow continuous unattended operation. An integral elongate stylus has a portion wrapped about an axis of rotation and the tip of a radially extending portion is brought to bear against the recording paper at a constant pressure and orientation irrespective of the accumulated erosion caused by prolonged operation. The aerodynamic resistance of a vane creates a force to displace the stylus to ensure its predetermined constant pressure and orientation as the stylus wears away to provide uniform operational characteristics over relatively long periods.

7 Claims, 4 Drawing Figures

PATENTED AUG 21 1973

PATENTED AUG 21 1973 3,754,282

HIGH RESOLUTION RECORDER

CROSS-REFERENCE TO A RELATED APPLICATION

There is disclosed and claimed herein an unobvious improvement over the invention set forth in U.S. Pat. No. 3,328,804 by Leighton L. Morse for his "High Speed Recorder with Centrifugal Stylus Feed".

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Recorders having styluses for mapping monitored phenomena on an electro-sensitive recording paper are many and varied in configuration. Rotary stylus mechanisms are preferred where high resolution is desirable and particularly in the case when operation for prolonged periods of time is anticipated. When operating conventional graphic recorders employing a rotating marking stylus, it becomes necessary to periodically stop the recorder to adjust the length of the stylus to maintain the proper stylus pressure and angle with respect to the recording paper as the stylus erodes or burns away. Consequently, the recorder must be shut down at intervals to allow replacement of the stylus. During these periods of shutdown, the incoming data cannot be recorded and is lost. While on a marine topography mapping mission, for example, such a loss of data would require back-tracking and remapping of the area not recorded. Most of the conventional electro-sensitive recorders do not lend themselves to unattended operation because of the need to frequently replace eroded styluses. The necessity for an operator to remove and replace the styluses has rendered most recorders unsuitable for unattended operation where such operation is desirable in hazardous situations.

SUMMARY OF THE INVENTION

A recorder having a motor to impart rotary motion to a stylus mechanism electronically cooperates with an electro-sensitive recording paper to provide a visual readout. The stylus mechanism defining a stylus mounting surface has a circumferentially disposed conduit radially extending to the surface of the electro-sensitive paper and carries a stylus therein having its outer tip in contact with the surface of the electro-sensitive recording paper. A vane is journaled on the shaft of the motor and is coupled to the stylus to hold the outer tip of the stylus against the electro-sensitive recording paper at a constant pressure and orientation irrespective of the eroding caused by prolonged operation of the recorder.

A prime object of the invention is to provide a recorder having improved operational characteristics.

Another object is to provide an improved recorder having a stylus electronically cooperating with an electro-sensitive recording paper for providing a high resolution readout.

Yet another object is to provide an improved recorder having the capability for being operated for prolonged periods of time.

Yet another object is to provide a recorder having a capability for providing constant operational characteristics unattended for prolonged periods of time.

A further object is to provide a stylus mechanism having a member aerodynamically cooperating to ensure an automatic continuous feeding of a recording stylus.

Yet another object is to provide a stylus held in place and operatively coupled to ensure constant character and marking of the readout on the electro-sensitive recording paper.

These and other objects of the invention will become more readily apparent from the ensuing specification when taken with the drawings.

DESCRIPTION OF THE PREFERRED EMBODIMENT

Figure 1:
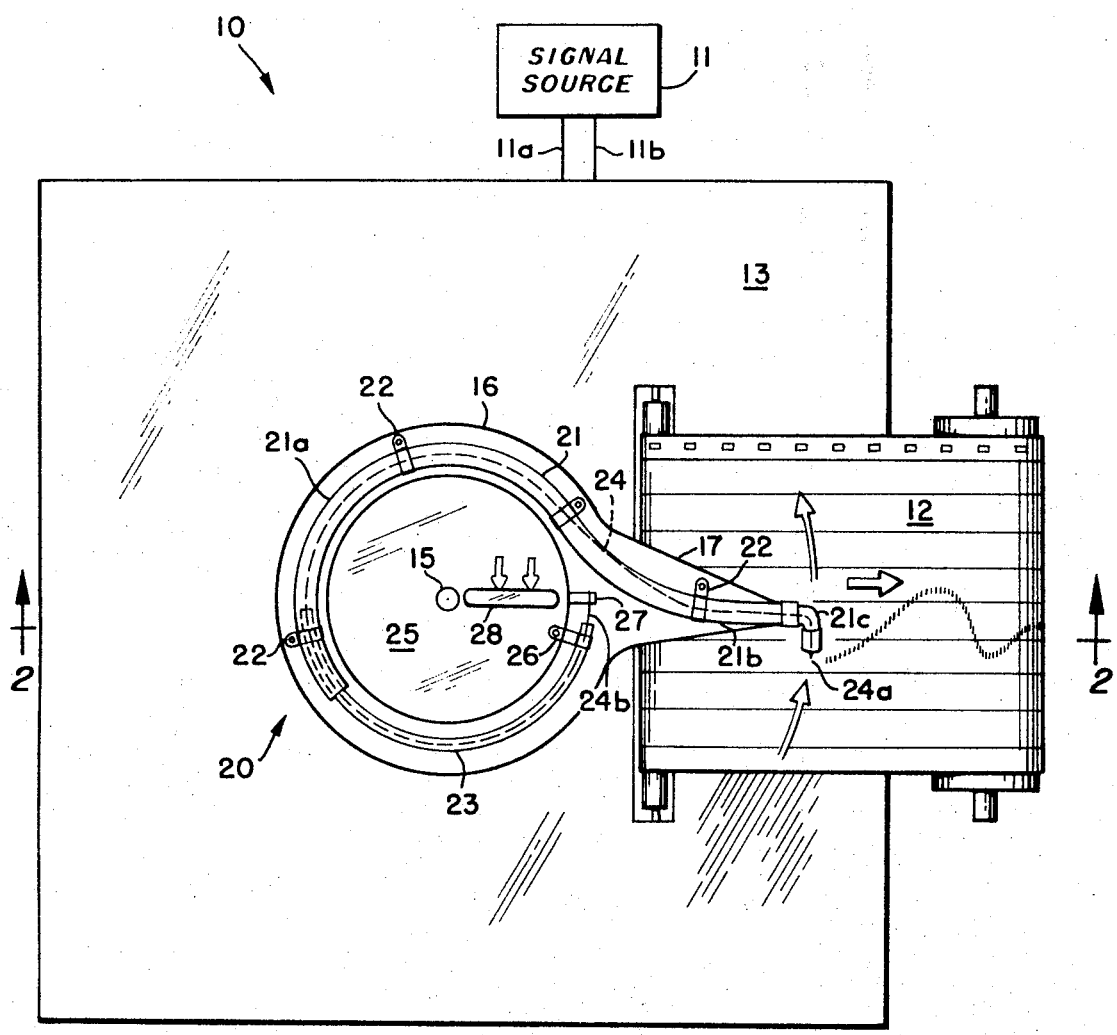
FIG. 1 is a top view of a preferred form of the invention.
Figure 2:
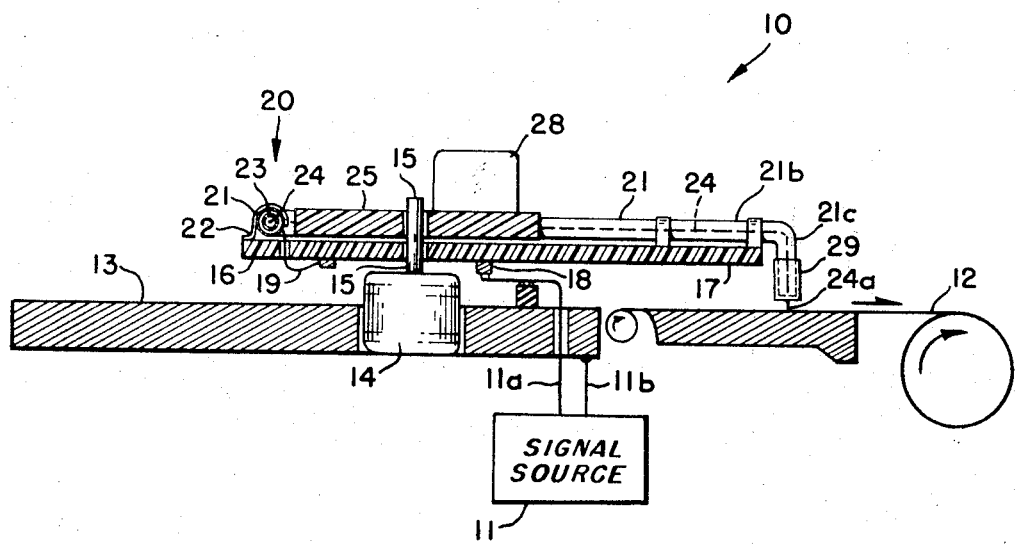
FIG. 2 is a cross-sectional view taken generally along lines 2—2 in FIG. 1.
Figure 3:
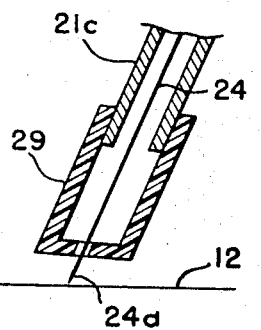
FIG. 3 is an end view of a stylus.

Referring now to the drawings, a high resolution recorder 10 is shown coupled to a source of signals 11 via a pair of leads 11a and 11b. The source of signals, optionally a hydrophone, microphone or other equivalent device which produces signals representative of some monitored phenomena lending itself to being presented on a visual readout is visually displayed by markings made on an electro-sensitive recording paper 12. An electro-sensitive recording paper marketed under the trade name "Teledeltos" was used satisfactory in the present application to provide responsive markings for signals representative of echos reflected from marine topography. The markings were produced by a voltage gradient created between a metal platen or base plate 13 and an exposed tip 24a of a stylus mechanism 20 only when the tip rubs across the recording paper surface.

The stylus mechanism is rotated at a predetermined constant speed in the neighborhood of 1,800 to 3.600 rpm by a motor 14. A shaft 15 extending from the motor is keyed onto a large disk 16 having an outwardly extending arm portion 17. The disk and shaft are fabricated from a plastic-like nonconductive material and the bottom of the large disk functions as a mounting surface for a slip ring and brush combination 18. The slip ring and brush combination couples signals appearing on one of the input leads 11a to the stylus mechanism via a lead 19 while the other input lead 11b is connected to base plate 13.

The components of the stylus mechanism include a metal outer tubing 21 which is secured to large disk 16 and arm portion 17 by several clamps 22. A semicircular portion 21a of the outer metal tubing has an inner diameter sized to slidingly accommodate the outer diameter of a small tubing 23. Since it is intended that the small tubing slide freely within the confines of the outer metal tubing, it has been found expedient to fashion the small tubing from a material having the strength and friction-free properties of the material commercially marketed under the trademark "Teflon".

Inside of the small tubing and throughout the length of the outer metal tubing runs a stylus wire 24, it being the element which actually "writes" on the surface of the electro-sensitive recording paper. Although the diameter of the stylus wire is not particularly critical, selecting wire having a small diameter of approximately 0.006 of an inch enhances the resolution of the recorder. Such a wire also possesses a degree of flexure which will allow its unimpeded travel through the metal tubing 21.

As mentioned before, the markings or writing on the electro-sensitive recorder paper occurs as a tip 24a of the stylus wire sweeps over the surface of the paper and a signal creating a potential gradient across the paper is fed to the stylus. An electrical path originates at signal source 11 and passes through lead 11a, through the slip ring brush combination 18, through lead 19 and to outer metal tubing 21. Since stylus wire 24 makes physical contact with the inner wall of the outer metal tubing along an arm portion 21b or an end portion 21c, completion of the electrical path to the stylus tip 24a is assured for making responsive traces on the electro-sensitive recording paper.

Continued, unattended prolonged operation of the present invention is owed to the inclusion of a small disk 25 journaled onto motor shaft 15. The disk is not secured to the shaft, but is journaled thereon to permit free motion which is not directly responsive to the rotation of large disk 16. A clamp 26 secures small tubing 23 onto small disc 25 and a projection 27 of small disk 25 is joined to an inner end 24d of the stylus wire.

Because of the small disk's interconnection to the small tubing via clamp 25 and projection 27, the small disk follows the rotary motion of large disc 16. However, by the inclusion of a rectangularly shaped vane 28 on the upper surface of small disk 25 force or aerodynamic resistance is created and coupled to the stylus mechanism. To elaborate, looking to FIG. 1, as the stylus mechanism rotates in a counterclockwise direction the vane presents a planar surface which must force air from its path. An equal and oppositely directed reactive force is tranferred from the vane to stylus wire 24 via clamp 26 and projection 27. This reactive force urges the stylus wire through outer metal tubing 21 and past its end portion 21c. The elbow between arm portion 21b and end portion 21c frictionally engages the stylus wire to absorb some of the reactive force.

By merely adjusting the size of the vane, the proper reactive force for forcing stylus tip 24a onto the recording paper is produced. That is to say, if the stylus tip begins to tear or cut into the recording paper as it sweeps over it, then the size of the vane is reduced to reduce the reactive force which presses stylus tip against the recording paper. On the other hand, if spotty or inconsistent tracing on the recording paper is noted, due to there not being sufficient force to hold the stylus tip on the recording paper, the size of the vane is increased to provide the necessary force.

Since the recording paper lies in the same lateral plane as the surface of platen 13, there is but minimal skipping or wear of stylus tip 24a as it contacts and leaves the surface of the recording paper. Skipping and wear of the stylus tip is further reduced by directing the orientation of end portion 21c oppositely from the direction that the stylus mechanism is rotated. A plastic sleeve 29 also is included on end portion 21c of the outer metal tubing to guide and to dampen the bouncing of stylus tip 24a as it traverses the relatively rough surface of the recording paper.

Figure 4:
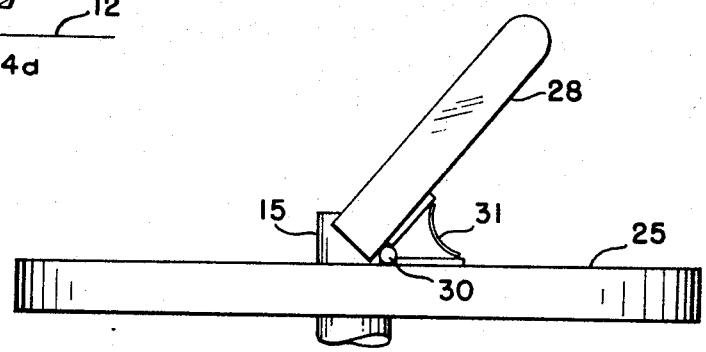
FIG. 4 shows a modification of the vane.

A modification of the invention is depicted in FIG. 4 which shows a hinge 30 coupling a rectangularly shaped vane 28 onto small disk 25. A biasing spring 31 is connected between the vane and disk and allows vane to be rotated about the axis of the hinge in a counterclockwise direction. At relatively low rotational velocities biasing spring 31 holds vane 28 is a substantially perpendicular attitude on the surface of the small disk and a predetermined force is transferred to press the stylus tip onto the paper. As the rotational velocity is increased, the increased aerodynamic resistance to faster rotary motion will impinge on vane 28 and cause it to be pivoted about the axis of hinge 30. The smaller frontal area or profile now presented by the vane lowers the reactive force coupled to the stylus wire to the magnitude of the predetermined force. Selecting a spring 31 to have the proper spring constant, ensures the creation of a uniform reactive force for feeding stylus wire 24 through the stylus mechanism irrespective of the rotational speed. Thus by this simple modification the recorder has a variable speed capability with a uniform high resolution.

Obviously, any modifications and variations of the present invention are possible in the light of the above teachings, and, it is therefore understood that within the scope of the disclosed inventive concept, the invention may be practiced otherwise than specifically described.

What is claimed is:

1. In a recorder having a motor connected to impart rotary motion to a stylus mechanism which electrically cooperates with an electro-sensitive recording paper to provide a visual readout, an improvement in the stylus mechanism is provided comprising:

means connected to the shaft of the motor for defining a stylus mounting surface;

means mounted on the stylus mounting surface for creating a conduit outwardly circumferentially disposed about said shaft and radially extending therefrom to the surface of the electro-sensitive recording paper;

means carried in the conduit and extending throughout its length for defining an elongate stylus having its outer tip in contact with the surface of the electro-sensitive recording paper; and means journaled on the shaft and connected to the inner end of said elongate stylus for reacting to said rotary motion to hold said outer tip on the electro-sensitive recording paper at a constant pressure and orientation irrespective of eroding caused by prolonged operation of said recorder.

2. A recorder according to claim 1 in which the conduit includes a metal tube electrically coupling said elongate stylus to a source of signals to be recorded and a flexible tubing sized for axial travel in said metal tube is coupled to the reacting means to guide the passage of said elongate stylus as said outer tip is eroded during prolonged operation.

3. A recorder according to claim 2 in which the reacting means is configured to present a surface aerodynamically adapted to provide a force for holding said outer tip of said elongate stylus in contact with the electro-sensitive recording paper.

4. A recorder according to claim 3 in which the reacting means includes a disk-shaped member secured to said flexible tubing and an orthogonally reaching vane for producing the force for holding said outer tip of said elongate stylus in contact with the electro-sensitive paper.

5. A recorder according to claim 4 in which the reacting means further includes a biasing spring connected to said vane adapted to reduce the profile of said vane when said recorder is driven at higher rotational speed.

6. A recorder according to claim 5 in which an outer end portion of said metal tube is shaped in an elbow configuration for frictionally retaining said elongate stylus.

7. A recorder according to claim 6 in which said disk-shaped member is journaled to freely rotate with respect to the means defining a stylus mounting surface.

* * * * *